![United States Patent Office logo] 3,252,824
Patented May 24, 1966

3,252,824
CARBONACEOUS SOLID BODIES AND PROCESSES FOR THEIR MANUFACTURE
Thomas P. Whaley, Baton Rouge, La., and Vello Norman, Chapel Hill, N.C., assignors to Ethyl Corporation, New York, N.Y., a corporation of Virginia
No Drawing. Filed Aug. 28, 1961, Ser. No. 134,145
2 Claims. (Cl. 117—107.2)

This invention relates to carbonaceous solid bodies comprising carbon and a metal, and to processes for their manufacture. More particularly, this invention relates to heterogeneous solid bodies, comprising carbon and a metal, and to processes for producing these heterogeneous solid bodies from homogeneous carbon solid bodies by decomposition of a metal compound in contact with said carbon solid body. This application is a continuation-in-part of our copending application Serial No. 3,721, filed January 21, 1960, now U.S. Patent No. 3,157,531.

Modern technology is increasingly calling for materials having a wide range of physical, chemical, electrical and mechanical properties. Carbon materials have long been known to have a wide range of applicability to many diversified processing environments because of their excellent physical, chemical and electrical properties. However, because of their lack of mechanical strength, carbonaceous solid bodies cannot be employed in certain environments where, because of their other properties, such carbonaceous solid materials would, otherwise, be highly desirable.

In the manufacture of carbonaceous solid bodies—particularly graphite carbonaceous solid bodies—it is a well known fact that electrical conductivity and strength is strongly dependent upon the density of the carbonaceous solid body. Thus, as density increases, conductivity and strength increases. It is therefore highly desirable to produce as dense a solid body as possible. In order to obtain high density it is necessary to resort to elaborate and expensive processing techniques. These techniques involve grinding and milling carbonaceous material, mixing and heating the resultant powders with a carbonaceous binder material; charging this material into a mold or extruder, where the solid shape is produced; thereafter, charging the resultant amorphous carbon containing shapes into a furnace where they are gas baked and then cooled for a period of days, and then transferring the baked shapes into a graphitizing furnace where graphitization takes place. However, even with such elaborate processing techniques, many of the carbon bodies produced contain interstices and other faults which adversely affect the strength of the body and also the electrical properties of the body.

Therefore, one of the foremost objects of this invention is to provide carbonaceous solid bodies having greatly improved mechanical properties by incorporating a metal into the structure of a porous carbon body. Another object is to materially modify in a desirable way the properties of carbonaceous solid bodies through incorporation of a metal therein. A further prime object of this invention is to provide a process for producing these metal-containing carbonaceous solid bodies. A more specific object is to provide high temperature heterogeneous carbonaceous solid bodies comprising graphite and a Group VI–B metal (i.e., chromium, molybdenum and tungsten) wherein the Group VI–B metal is integrated into the graphite structure. These and other objects shall appear more fully hereinafter.

This invention provides a carbonaceous solid body comprising carbon and a Group VI–B metal (i.e., chromium, molybdenum and tungsten). In general, the metal is integrated into the carbonaceous solid body to provide a heterogeneous solid body which comprises a porous carbon solid body, wherein the surface of the porous carbon body is covered with a metal coating. A preferred heterogeneous solid body produced by this invention, particularly adapted for high temperature, high mechanical stress applications, comprises a porous graphite solid body wherein the surface of the porous graphite solid body is covered with a substantially continuous tungsten coating.

Another, and preferred, embodiment resulting from this invention is a heterogeneous solid body which comprises a porous carbon solid body wherein the interstices of said solid body are impregnated with a metal. These materials have significantly improved thermal and electrical properties.

Another aspect of this invention is the production of a heterogeneous solid body which comprises a porous solid carbon body wherein the interstices of the porous solid carbon body are impregnated with a metal and the outer surface of the porous solid carbon body is covered with a metal coating. In other words, this latter heterogeneous solid body has a metal exterior and an interior comprising a porous solid carbon body impregnated with a metal. Particularly preferred is a heterogeneous solid body comprising a porous solid graphite carbon body wherein the interstices of said porous solid graphite body are impregnated with tungsten and the outer surface of said porous solid graphite body is covered with a tungsten coating. These heterogeneous solid bodies, which combine impregnation and coating, are a particularly preferred embodiment of this invention, since they have excellent densities, strengths, and heat resistances.

The process of this invention which so conveniently and economically provides the heterogeneous solid bodies comprises decomposing an aromatic penetration complex of a metal in contact with a porous carbon solid body, said metal being selected from the group consisting of chromium, molybdenum and tungsten. The phrase "aromatic penetration complex of a Group VI–B metal" may be further defined as a diarene Group VI–B metal. A further embodiment of the present invention is the process of thermally decomposing a heat decomposable aromatic penetration complex of a metal in contact with a porous carbon solid body wherein the metal is a Group VI–B metal.

When a diarene chromium compound is employed in the process of this invention, the decomposition temperatures generally can range from about 300° C. to about 500° C. However, it is preferred when using diarene chromium plating agents to employ a temperature range from about 350° C. to about 470° C. and a pressure in the plating chamber from about 0.1 to about 10 mm. of mercury.

When a diarene molybdenum plating agent is employed in the process of this invention, decomposition temperatures ranging from about 350° C. to about 550° C. are generally employed. However, it is preferred to use temperatures of 400° C. to 500° C. since purer plates are obtained within this range. The pressures employed in plating from a diarene molybdenum compound are generally within the range of about .01 to about 10 mm. of mercury. It is to be understood that the most desirable temperature range for all of the diarene Group VI–B metal compounds depends upon the number of carbon atoms present in the compound. For example, dibenzene chromium is capable of being plated successfully at somewhat lower temperatures than dicumene chromium.

When a diarene tungsten plating agent, a preferred embodiment of this invention, is employed, the decomposition temperatures generally range from about 400° C. to about 600° C. and it is preferred to employ temperatures ranging from about 450° C. to about 550° C. since better plates are obtained within this temperature range. The pressures employed in the plating chamber, like the other diarene Group VI-B metal compounds, generally range from about .01 to about 10 mm. of mercury.

Plating from a diarene tungsten compound is an especially preferred embodiment of this process since it fulfills a particular need in the prior art. For example, in the past when graphite has been employed as a material in non-cooled rocket nozzles for solid fuel rocket engines, high temperatures, halogen-containing gases and extreme forces have caused the graphite to erode. Since the thrust of a rocket engine is dependent upon the size of aperture through which the hot gases pass, this erosion of the nozzle in turn causes a loss of thrust. This fault is essentially cured by plating a graphite nozzle with tungsten from a diarene tungsten compound in accordance with this invention. The particular tungsten plate resulting from the use of the diarene tungsten compounds as the plating agents causes a greatly increased corrosion resistant product which is derived from an essentially consistent aperture through which the heated gases of the rocket engine pass. While we do not fully understand why the tungsten plate produced in our process is so eminently successful in overcoming the foregoing problems, it definitely appears to be related to the chemical properties and physical characteristics (grain size, crystallographic structure, etc.) of the plate formed when the diarene tungsten compounds are decomposed in contact with the hot graphite substrate.

Thermal decomposition is a preferred mode of carrying out the various embodiments of this invention. In general, therefore, the products of this invention are provided by a process which comprises the thermal decomposition of a heat decomposable metal compound in contact with a porous carbon solid body. When such thermal techniques are employed, the porous solid carbon body is heated to a temperature above the decomposition temperature of the metal compound—which is an aromatic penetration complex of a Group VI-B metal—and said metal compound is contacted with said heated porous carbon solid body. Graphite is generally preferred as the carbon solid body. A particularly preferred process within the scope of this invention comprises heating a porous graphite solid body to a temperature above the decomposition temperature of the aromatic penetration complex of a Group VI-B metal.

In designing the heterogeneous solid bodies of this invention, the selection of the metal constituent becomes very important in obtaining the desired properties for a particular use. Thus, although the mechanical properties of carbonaceous solid bodies are generally significantly improved through the incorporation of a metal therein, other properties, such as chemical and electrical properties, are dependent on several factors among which the following are some of the more important; (I) the properties of the metal constituent of the plating agent (i.e., metal containing source of the metal coating), (II) the type of plating agent employed, (III) the technique chosen for incorporating the metal into the carbonaceous body, and (IV) the thickness of the metal coatings.

The metals which comprise the metal constituent of the metal compounds of this invention are, in general, any metals of Group VI-B (Periodic Chart of the Elements, Fisher Scientific Company, 1955). Molybdenum and tungsten are especially preferred because they possess, in addition to the last mentioned properties, excellent high temperature tensile strengths and melting points of $2600+°$ C. and $3400°$ C. respectively.

This invention, therefore, clearly provides an unusually inexpensive and simple technique for producing novel carbonaceous materials, which have thermal, mechanical and electrical properties heretofore unobtainable in carbonaceous materials. As pointed out above, operations commercially in force today go through tedious and expensive processing techniques to achieve density in carbonaceous materials and to impart as great mechanical strength as possible to these materials. However, it is well known that, even after such elaborate, painstaking steps have been undertaken to achieve this greater strength, these carbonaceous materials still fall far short of the necessary mechanical strength to make them reliable in certain processing environments which contain mechanical stress. For example, heat exchangers which are made of carbonaceous materials are extremely susceptible to mechanical shock. Therefore, although these materials are unsurpassed in their thermal conductivity properties, corrosion resistance properties, and other desirable physical and chemical properties, their use is limited because of susceptibility to mechanical shock. Furthermore, these carbonaceous heat exchanger materials are difficult to seal, a shortcoming which results in leakage at their joints. However, the novel heterogeneous solid bodies of this invention overcome these deficiencies by incorporating a metal into prior art carbonaceous materials, said metal being integrated into the carbonaceous structure in the various ways described above. Tungsten is the preferred metal for coating of carbonaceous heat exchanger materials—although, in general, any metal having good mechanical characteristics at the temperature of the particular application can be employed. Through this metal integration, the mechanical strength of these materials is greatly increased. Furthermore, highly unusual is the fact that this mechanical strength is greatly increased even when only a micro-molecular film of metal coating covers the interstitial surfaces of the carbonaceous material.

Increase in mechanical strength of the carbonaceous-metal heterogeneous body is not the only advantage realized from the incorporation of metal into carbonaceous solid bodies. An unusual increase in thermal conductivity is another advantage which is realized. This increase in thermal conductivity has particular adaptability to carbonaceous heat exchanger equipment. Metals preferred for incorporation in the carbonaceous solid bodies to increase the thermal conductivity thereof are molybdenum and tungsten.

These heretofore unobtainable heights of mechanical strength and thermal conductivity are achieved in a very economical and simple manner. For example, it is not necessary to employ, as the starting carbonaceous material into which the metal is to be integrated, an extremely high density carbon or graphite material. Lower density materials can be "upgraded" to the desired mechanical and thermal properties with such cheap and easily obtainable metals.

Economical, mechanically strong high performance electrodes can be "tailor-made" for various processing operations by the proper selection of the metallic constituent of the heterogeneous metal-carbon solid body. Here again considerable economical advantage can be realized, since it generally would not be necessary to employ high density, high cost carbonaceous starting materials, but, rather, lower density, lower cost, porous carbon materials could be employed. These low cost carbon materials are then "upgraded" through the process of this invention to the desired conductivity-density relationship. In this latter respect, it should be noted that high density is not necessary for many of the products of this invention. Since metal is incorporated in the carbonaceous structure, conductivity, equal to or better than the best high density, pure carbonaceous structures, can be achieved in a lower density heterogeneous metal-containing carbonaceous structure.

The metal plates obtained on the carbonaceous substrates are pure and essentially free from oxides and carbides. The purity of the plates is highly unexpected in view of the Group VI-B metal-aromatic penetration complexes used pursuant to this invention have a higher carbon content than the Group VI-B metal carbonyls. Yet the metallic carbonyls produce impure plates whereas, unexpectedly, the Group VI-B metal-aromatic penetration complexes produce essentially pure plates. The metallic carbonyls yield a higher carbide content with higher deposition temperatures. To the contrary, the arene compounds of this invention yield less carbide at high temperatures, while said high plating temperatures impart a better bond between the metal plate and the substrate.

In summary, the heterogeneous solid bodies produced by this invention are extremely novel materials which find applicability in a multitude of environments requiring high performance electrical, physical, mechanical and chemical properties. By the utilization of the simple and economical processes of this invention, these novel solid bodies can be "tailor-made" for the particular end use held in mind.

Thermal decomposition is the preferred mode of carrying out the present decomposition process. Thus, in general, any prior art technique for metal plating an object by thermal decomposition of the metal-containing compound can be employed as a plating technique. For example, any technique heretofore known for the decomposition and subsequent plating of Group VI–B metals from the hexacarbonyl derivative of those metals can be employed. Illustrative are those techniques described by Lander and Germer, American Institute of Mining and Metallurgical Engineers, Technical Publication No. 2259 (1947). Usually the technique to be employed comprises heating the object to be plated (i.e., the porous carbon solid body) to a temperature above the decomposition temperature of a metal-containing compound and, thereafter, contacting the metal-containing compound with the heated object. Generally, the neutral aromatic penetration complexes of the Group VI–B metals are used and when carrying out these vapor phase techniques the carbon solid body is heated to a temperature of above about 300° C. and maintained under an inert atmosphere. The following examples are more fully illustrative of the process of this invention.

In Example I–II the following technique was used:

Into a conventional heating chamber provided with means for heating and gas inlet and outlet means is placed the porous carbon solid body to be plated. The metal-containing plating agent (i.e., the metallic source for the metal coating) is placed in a standard vaporization chamber provided with heating means, said vaporization chamber being connected through an outlet port to the aforesaid combustion chamber inlet means.

For the plating operation the object to be plated is heated to a temperature above the decomposition temperature of the metal-containing plating agent, the system is evacuated and the metalliferous compound is heated to an appropriate temperature where it possesses vapor pressure of up to about 10 millimeters. In most instances the process is conducted at no lower than 0.01 millimeter pressure. The metal-containing vapors are pulled through the system as the vacuum pump operates and they impinge on the heated object decomposing and forming the metallic coating. In most instances no carrier gas was employed, however, in certain cases a carrier gas can be used to increase the efficiency of the above disclosed plating system. In those cases where a carrier gas is employed, a system such as described by Lander and Germer, page 7, can be utilized. It should be noted that in carrying out the above described thermal decomposition process the porous carbon solid body is heated to a relatively uniform temperature throughout. Thus, the process of this invention is a "controlled" decomposition process wherein the rate of decomposition is such that the vapors of the metal-containing plating agent permeate the interstices of the porous carbon solid body before substantial decomposition of said metal-containing plating agent occurs.

*Example I*

Compound _____ $(C_6H_6)_2Cr$ (dibenzene chromium).
Compound temp. _____ 130° C.
Substrate _____ Porous graphite strip.
Substrate temp. _____ 450°–500° C.
Pressure _____ .10 mm. Hg.
Time _____ 6 hours, 5 minutes.
Result _____ Silvery metallic appearance.

*Example II*

Compound _____ $(C_6H_6)_2Cr$ (dibenzene chromium).
Compound temp. _____ 140° C.
Substrate _____ Porous graphite strip.
Substrate temp. _____ 500° C.
Pressure _____ .03 mm. Hg.
Time _____ 5 hours, 5 minutes.
Result _____ Silvery metallic appearance.

The Group VI–B metal aromatic penetration complexes of this invention may be further defined as diarene Group VI–B metal compounds. The Group VI–B metals include chromium, molybdenum and tungsten as set out in the Periodic Chart of Elements, Fisher Scientific Company, 1959. The aromatic portion of the compound generally can contain up to about 18 carbon atoms and preferably up to about 12 carbon atoms. Typical aromatic hydrocarbons which form a portion of the diarene Group VI–B compounds include benzene, diphenyl naphthalene, 1,2,3,4-tetrahydronaphthalene, indene, fluorene, anthracene, toluene, xylenes, mesitylene, ethyl benzene, cumene, hexamethyl benzene, alkylated naphthalenes, alkylated anthracenes, and the like.

Typical examples of the Group VI–B metal organic penetration complexes are dibenzene chromium, dibenzene molybdenum, dibenzene tungsten, dimesitylene chromium, dimesitylene molybdenum, dimesitylene tungsten, ditoluene chromium, ditoluene molybdenum, ditoluene tungsten, dicumene chromium, dicumene molybdenum, dicumene tungsten, dixylene chromium, dixylene molybdenum, dixylene tungsten, bis(diethylbenzene) chromium, bis(diethylbenzene) molybdenum, bis(diethylbenzene) tungsten, bis(propylbenzene) chromium, bis(propylbenzene) molybdenum, bis(propylbenzene) tungsten, bis(isocumene) chromium, bis(isocumene) molybdenum, bis(isocumene) tungsten, bis(pseudocumene) chromium, bis(pseudocumene) molybdenum, bis(pseudocumene) tungsten, bis(n-butylbenzene) chromium, bis(n-butylbenzene) molybdenum, and bis(n-butylbenzene) tungsten.

The diarene Group VI–B metal compounds can generally be produced by any prior art method. One such method is set out in U.S. Patent 2,892,857. This process involves heating under an inert elemental gas to a temperature between about 80° C. and 300° C. in the presence of an amalgam finely divided metal from magnesium to zinc inclusive in electromotive series, an anhydrous mixture of a Group VI–B metal halide, an aromatic hydrocarbon and an inorganic salt wherein the metal of said salt is capable of reducing a Group VI–B metal cation to a lower valence state and then hydrolyzing the reaction mixture to obtain the diarene Group VI–B metal compound.

The following examples employ the process of Examples I–II with the exception that the heat means utilized comprise infrared heating and supplementary resistance heating. These examples more fully demonstrate the gaseous heat decomposable metal-bearing compounds which can be employed in the thermal decomposition process of this invention.

*Example III*

Compound _____ $(C_6H_6)_2W$ (dibenzene tungsten).
Compound temp. _____ 160° C.
Substrate _____ Porous graphite.
Substrate temp. _____ 475° C.
Pressure _____ 0.1 mm. Hg.
Time _____ 4 hours.
Result _____ Firmly adherent, metallic plate.

Example IV

| | |
|---|---|
| Compound | $(C_6H_6)_2W$ (dibenzene tungsten). |
| Compound temp. | 170° C. |
| Substrate | Type A graphite. |
| Substrate temp. | 500° C. |
| Pressure | .02 mm. Hg. |
| Time | 3 hours. |
| Result | Silvery metallic plate. |

Example V

| | |
|---|---|
| Compound | $(C_6H_6)_2W$ (dibenzene tungsten. |
| Compound temp. | 170° C. |
| Substrate | Type W graphite. |
| Substrate temp. | 480° C. |
| Pressure | 0.1 mm. Hg. |
| Time | 6 hours. |
| Result | Gray metallic plate. |

Example VI

| | |
|---|---|
| Compound temp. | $(C_6H_6)_2Cr$ (dibenzene chromium). |
| Compound temp. | 150° C. |
| Substrate | Porous graphite. |
| Substrate temp. | 420° C. |
| Pressure | 0.2 mm. Hg. |
| Time | 3 hours. |
| Result | Bright metallic coating. |

Example VII

| | |
|---|---|
| Compound | $(C_6H_6)_2Mo$ (dibenzene molybdenum). |
| Compound temp. | 140° C. |
| Substrate | Porous graphite. |
| Substrate temp. | 450° C. |
| Pressure | 1.1 mm. Hg. |
| Time | 8 hours. |
| Result | Gray, silvery metallic plate. |

Example VIII

| | |
|---|---|
| Compound | $(C_6H_6CH_3)_2Mo$ (ditoluene molybdenum). |
| Compound temp. | 155° C. |
| Substrate | Porous graphite. |
| Substrate temp. | 450° C. |
| Pressure | 0.1 mm. Hg. |
| Time | 2 hours. |
| Result | Silvery plate. |

Example IX

| | |
|---|---|
| Compound | $[C_6H_4(CH_3)_2]_2Cr$ (dixylene chromium). |
| Compound temp. | 130° C. |
| Substrate | ATJ graphite. |
| Substrate temp. | 400° C. |
| Pressure | 0.1 mm. Hg. |
| Time | 3.5 hours. |
| Result | Silvery plate. |

Example X

| | |
|---|---|
| Compound | $[C_6H_3(CH_3)_3]_2Mo$ (dimesitylene molybdenum). |
| Compound temp. | 155° C. |
| Substrate | ATJ graphite. |
| Substrate temp. | 475° C. |
| Pressure | 1 mm. Hg. |
| Time | 6 hours. |
| Result | Gray, silvery appearance. |

Example XI

| | |
|---|---|
| Compound | $[C_6H_4(CH_2CH_3)_2]W$ [bis(diethylbenzene) tungsten]. |
| Compound temp. | 175° C. |
| Substrate | ATJ graphite. |
| Substrate temp. | 500° C. |
| Pressure | .1 mm. Hg. |
| Time | 3 hours. |
| Result | Dark, silvery appearance. |

Although thermal decomposition is the preferred mode of carrying out the process of this invention, other decomposition techniques can be employed. Thus, the following working example is illustrative of the decomposition of a manganese compound by ultrasonic frequency.

The process employed in Examples I–II is essentially followed with the exception that an ultrasonic generator is proximately positioned to the plating apparatus. In this example the vapor of the compound is heated to its decomposition threshold, i.e., in the vicinity of 250° C., and thereafter the ultrasonic generator is utilized to effect final decomposition.

Example XII

| | |
|---|---|
| Compound | $(C_6H_6)_2W$ (dibenzene tungsten). |
| Compound temp. | 170° C. |
| Substrate | 10 percent porosity graphite. |
| Substrate temp. | 490° C. |
| Time | 8 hours. |
| Pressure | .1 mm. Hg. |
| Result | Dark, silvery appearance. |

Another method for decomposing the plating agent of this invention is by decomposition with ultraviolet irradiation. The following example is illustrative of this technique.

The method of Examples I–II is employed with the exception that the infrared heating means is supplemented with an ultraviolet irradiating means. Thus, in this case, a battery of ultraviolet and infrared lamps are placed circumferentially around the exterior of the heating chamber. The substrate to be heated is brought to a temperature just below the decomposition temperature of the plating agent with the infrared heating and thereafter decomposition is effected with ultraviolet rays.

Example XIII

| | |
|---|---|
| Compound | $[C_6H_5CH(CH_3)_2]_2Mo$ (dicumene molybdenum). |
| Compound temp. | 155° C. |
| Substrate | 25 percent porosity graphite. |
| Substrate temp. | 470° C. |
| Time | 2 hours. |
| Pressure | .1 mm. Hg. |
| Result | Gray appearance. |

In some instances it is desirable to employ external resistance heating in the process of this invention. The following example is illustrative of this technique. The method of Example XIII is employed with the exception that the heating chamber is housed in a resistance furnace rather than being surrounded by a battery of infrared and ultraviolet lamps. For the plating operation the object to be plated is heated to a temperature above the decomposition temperature of the plating agent and thereafter the decomposition is effected.

Example XIV

| | |
|---|---|
| Compound | $(C_6H_5C_3H_7)_2Cr$ (bis(propylbenzene) chromium). |
| Compound temp. | 145° C. |
| Substrate | 50 percent porosity graphite. |
| Substrate temp. | 450° C. |
| Pressure | .1 mm. Hg. |
| Time | 3 hours. |
| Result | Silver appearance. |

Induction heating is another technique which can be employed in the process of this invention. Thus, the process of Examples I–II is employed with the exception that the graphite object to be plated is placed into a conventional heating chamber provided with means for high frequency induction heating as opposed to the former process where heating is effected by infrared heating means.

*Example XV*

Compound _____ $(C_6H_5C_4H_9)_2Cr$ [bis(n-butylbenzene) chromium].
Compound temp. __ 150° C.
Substrate _____ 80 percent porosity graphite.
Substrate temp. ___ 475° C.
Pressure _____ 1.2 mm. Hg.
Time _____ 1 hour.
Result _____ Blue silver appearance.

The porous carbon solid body which comprises the object into which the metal is integrated can be an amorphous carbon solid body or a graphite solid body. Thus, the term "porous carbon solid body" is meant to include both amorphous carbon and graphite shapes.

Generally, these porous carbon bodies have an apparent porosity ranging from about 1–50 percent (apparent porosity as used herein is defined as the volume of open pore space per unit total volume. See Hackh's Chemical Dictionary, 3rd edition, 1944, page 674).

The term "surface" as employed herein is meant to include (1) the exterior surface of the solid body and (2) the apparent or interstitial surface, i.e., that total surface of porous solid body exposed to contact with the vapors of the metal-bearing plating agent.

In general, the metallic coatings which are plated on the surface of the porous carbon solid bodies are of micro-molecular thickness. However, when the exterior of said solid body is coated, a coat of considerably greater thickness can be plated thereon, depending upon the processing conditions chosen. However, it is generally preferred, for economic reasons, to utilize as thin a coat as sufficient for the plating operation. In general, the thickness of the coats ranges from about 0.01 mil to 50 mils.

It should be noted that when employing the metal-containing plating agents of this invention it is necessary to maintain enough vapor pressure below the decomposition temperature of the plating agent to enable the process to be conducted at an appreciable rate of plating. Too high vapor pressure results in poor substrate adherence. Thus, it is preferred to employ up to about 10 mm. pressure during the plating operation—preferably 0.01 to 10 mm. pressure.

Temperatures are very important in obtaining the desired product. Thus, although temperatures above the decomposition temperature of the metal-containing compound can in general be employed in the process of this invention, a preferred temperature generally exists for each plating agent. When this temperature is employed better plating results can be obtained.

Although the plating compounds of the present invention vary insofar as their thermal stability is concerned, they can generally be decomposed at a temperature of about 600° C. Generally, temperatures ranging from about 300° C. to about 550° C. are employed, depending on the compound being employed.

The metal-carbon heterogeneous solid bodies produced in this invention find a multitude of uses, particularly in aircraft, missile and chemical processing industries. Thus, aircraft and missile components which require ultra high quality performance characteristics involving high strength, excellent resistance to high temperatures and chemical attack are some of the applications for these materials. More specifically, the products of this invention find application as rocket nozzles, bearings and rocket guidance fins.

In the chemical processing industry, the products produced by this invention find use in equipment subjected to high temperatures and chemical attack—as, for example, heat exchangers employed in such an environment. Furthermore, such materials as chromium or molybdenum heterogeneous graphite solid bodies find particular utility for encapsulation of nuclear reactor fuel elements. By encapsulating nuclear reactor fuel elements in heterogeneous solid "container," escape of highly dangerous radio active fission by-products is conveniently prevented. The heterogeneous metal-carbonaceous solid bodies of this invention, wherein the metal is a metal having excellent electrical properties, provide excellent electrodes for various electrolytic processing techniques.

Thus, having fully described the novel products of the present invention, modes for their preparation and methods for their employment, we do not intend that our invention be limited except as within the spirit and scope of the appended claims.

We claim:

1. A process for producing a tungsten coated graphite rocket nozzle capable of withstanding high temperature halogen-containing gases having a high velocity, said process comprising (1) heating a graphite rocket nozzle having an apparent porosity of about 1 to 50 percent to a temperature of from about 400 to 600° C., (2) generating vapors of a neutral diarene tungsten compound by heating said compound in a non-oxidizing atmosphere sufficient to produce a vapor pressure of up to 10 millimeters of mercury, (3) contacting the graphite rocket nozzle heated to the above temperature with said vapors in a non-oxidizing atmosphere of a pressure less than 10 millimeters of mercury, and (4) maintaining said graphite rocket nozzle at said temperature while continually contacting it with said vapors until a tungsten coating of from about 0.01 to 50 mils in thickness is achieved.

2. The process of claim 1 further characterized in that said diarene tungsten compound is dibenzene tungsten thermally decomposed at a temperature of from about 450° C. to 550° C.

References Cited by the Examiner

UNITED STATES PATENTS

| | | | |
|---|---|---|---|
| 2,200,846 | 5/1940 | Lattmann | 117—107.2 |
| 2,698,812 | 1/1955 | Schladitz | 117—107.2 |
| 2,953,586 | 9/1960 | Hafner et al. | 117—107.2 |
| 2,995,471 | 8/1961 | Gurinsky | 117—107.2 |

OTHER REFERENCES

Porter: "Rocket Refractories," 60/35.6R p. 22, Aug. 26, 1955, publ. by OTS.

RICHARD D. NEVIUS, *Primary Examiner.*

CARL D. QUARFORTH, *Examiner.*

F. W. SHERLING, M. DINNIN, A. GOLIAN,
*Assistant Examiners.*